US012631774B2

(12) United States Patent
Albagli et al.

(10) Patent No.: US 12,631,774 B2
(45) Date of Patent: May 19, 2026

(54) SHIELDED X-RAY DETECTOR WITH IMPROVED IMAGE QUALITY STABILITY

(71) Applicant: GE Precision Healthcare LLC, Wauwatosa, WI (US)

(72) Inventors: Douglas Albagli, Clifton Park, NY (US); William Hennessy, Schenectady, NY (US); Robert Gallup, Wilton, NY (US); Benjamin Backes, Latham, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 83 days.

(21) Appl. No.: 18/234,679

(22) Filed: Aug. 16, 2023

(65) Prior Publication Data

US 2025/0060492 A1    Feb. 20, 2025

(51) Int. Cl.
*G01T 1/20* (2006.01)

(52) U.S. Cl.
CPC ...... *G01T 1/20183* (2020.05); *G01T 1/20181* (2020.05); *G01T 1/20184* (2020.05)

(58) Field of Classification Search
CPC ............. G01T 1/20181; G01T 1/20183; G01T 1/20184
See application file for complete search history.

(56) References Cited

U.S. PATENT DOCUMENTS

2013/0221230 A1* 8/2013 Tredwell ................ G01N 23/04
                                                    438/69
2014/0027828 A1* 1/2014 Kim .................... H10F 39/8057
                                                    257/292
2020/0379132 A1* 12/2020 Na .......................... G01N 23/04

OTHER PUBLICATIONS

Huang J.L., et al., "The electromagnetic shielding effectiveness of indium tin oxide films", 2001, Ceramics International, 27, p. 363-365. (Year: 2001).*

* cited by examiner

*Primary Examiner* — Mark R Gaworecki
(74) *Attorney, Agent, or Firm* — Boyle Fredrickson, S.C.

(57) ABSTRACT

The image quality and useful life of an x-ray imaging detector is enhanced by adding a shield layer between the photodiode/thin film transistor (TFT) array and the cesium iodide (CsI)-based scintillator/scintillator layer. The shield layer prevents dynamic charge coupling between a CsI/parylene layer located above the shield layer and the conductive data transfer lines located below the shield layer and operably connected to the individual pixels of the photodiode/TFT array to effectively maintain the level of various image quality parameters over time, including the modulation transfer function (MTF), and the Signal to Noise Ratio (SNR).

20 Claims, 14 Drawing Sheets

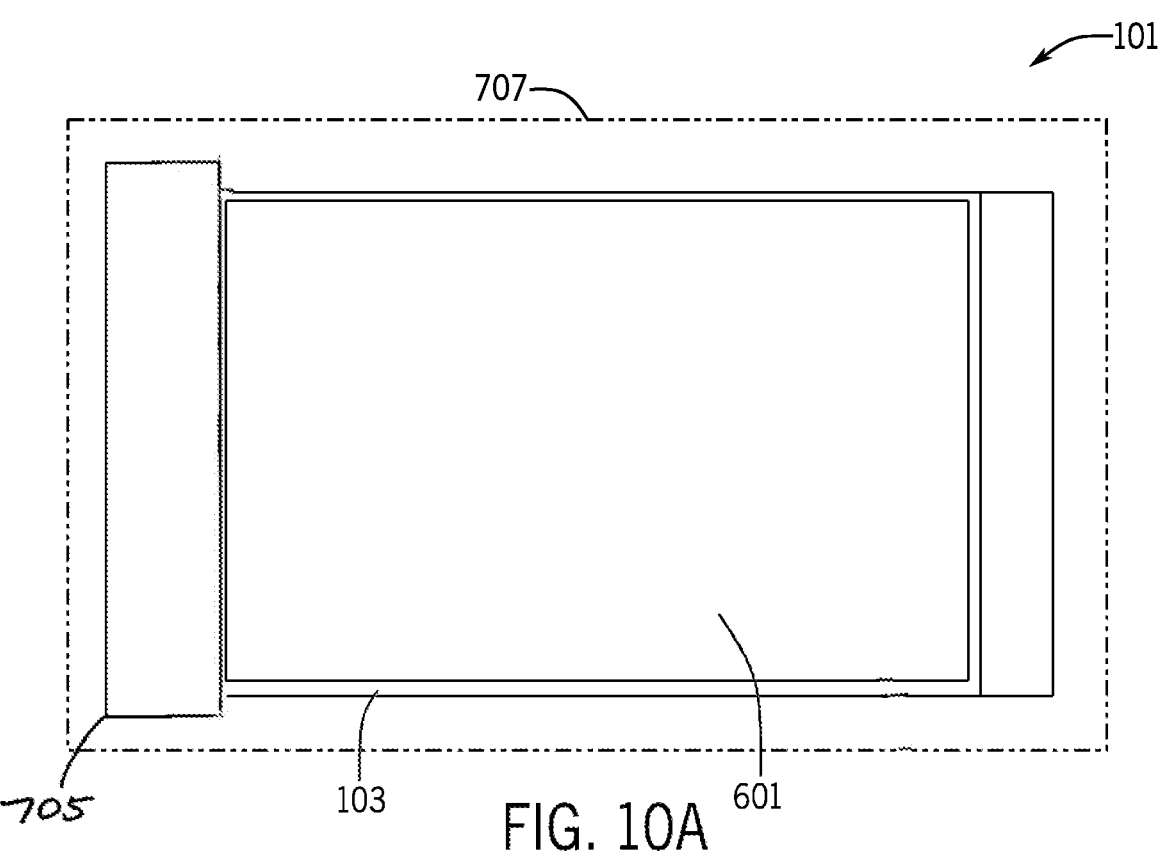
FIG. 10A
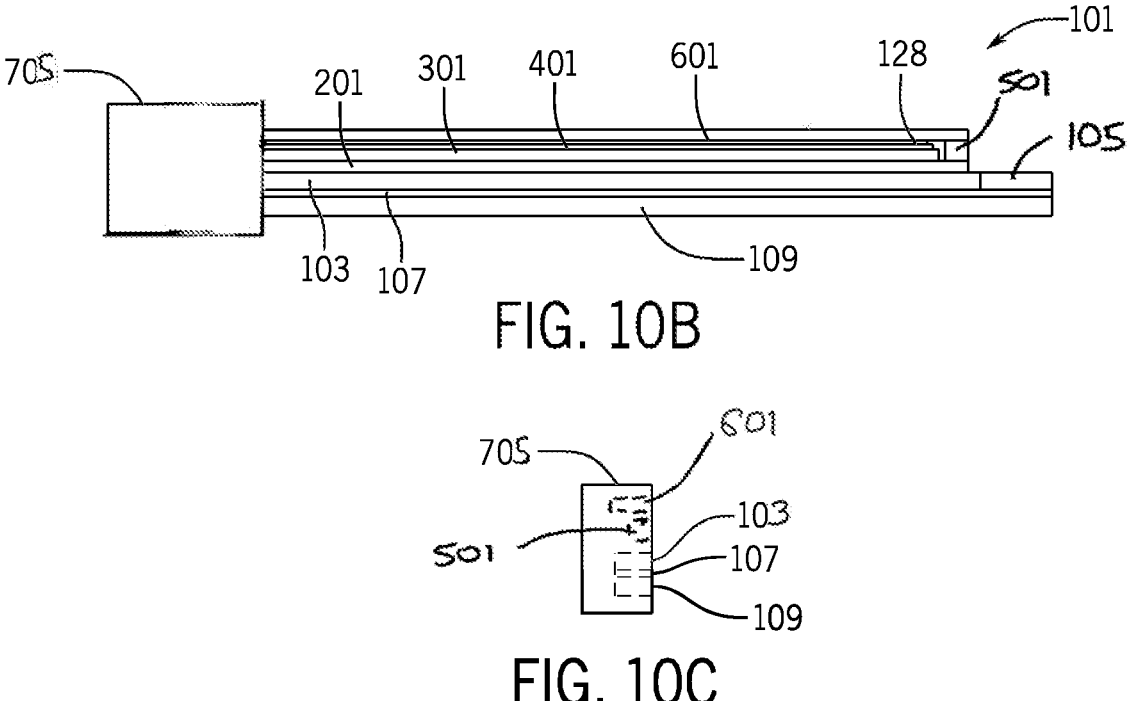
FIG. 10B
FIG. 10C

SHIELDED X-RAY DETECTOR WITH IMPROVED IMAGE QUALITY STABILITY

BACKGROUND OF THE DISCLOSURE

The present description relates generally to medical or industrial imaging and x-ray detectors.

Detectors may use a photosensor including an array of photosensitive elements or panels to provide a desired area for detection. A scintillator layer or x-ray sensitive material may be layered onto one side of the array of photosensitive elements. Additional materials, layers, and/or components may be positioned between and/or around either or both of the photosensitive elements and the scintillator layer in order form the photosensor.

A common technology used to make high resolution digital x-ray detectors for mammography and vascular applications includes a CsI-based scintillator directly deposited on a pixelated array of photodiodes and thin-film transistors (TFTs). With reference to FIG. 14 an exemplary pixelated array 1000 for an x-ray detector 1001 including a number of photodiodes 1002 and TFTs 1004 in a dielectric layer 1005 is illustrated. The array 1000 includes a substrate layer 1001 on which the photodiodes 1002 and TFTs 1004 are positioned, and a CsI-based scintillator or scintillator layer 1008 positioned over the photodiodes 1002 and TFTs 1004 on the dielectric layer 1005 opposite the substrate layer 1001. The TFTs 1004 are interconnected with a number of scan lines 1010 that carry control signals to the TFTs 1004 to control the operation of the TFTs 1004 to output scan data received from the photodiodes 1002 connected to each TFT 1004, i.e., along interconnected data transfer lines 1012 for use in the creation of a high resolution scan image.

Although CsI-based scintillator layer 1008 has many advantages as a high resolution scintillator, its performance will degrade over time as moisture from the surrounding environment is absorbed into the CsI crystals forming the scintillator layer 1008. This degradation can be greatly reduced by an implementation of a diffusion-resistant layer or semi-hermetic seal 1014 on and/or around the perimeter of the array 1000 and the scintillator layer 1008 to protect the CsI from the ambient moisture to achieve an acceptable level of degradation over an expected 8+ years of life for the detector formed with the array 1000 and CsI-based scintillator layer 1008.

To even further limit the effects of absorption of moisture, the degradation caused by moisture absorption can be completely eliminated to attain exemplary performance by employing parylene as the protective moisture barrier layer 1014 over the top of the CsI scintillator layer 1008. With the inclusion of parylene as the moisture barrier layer 1014, moisture is prevented from contacting the CsI crystals and degrading the operation of the scintillator layer 1008 formed of the CsI crystals.

However, it has been observed that while stable performance of the spatial resolution provided by the scintillator layer 1008 is achieved with this sealing layer approach, as measured by the modulation transfer function (MTF), there is also observed a steady increase over time in the electronic noise in the scan/image data. This increase in the electronic noise causes the degradation of the signal-to-noise ratio (SNR), another important image quality parameter The parylene layer 1014 is not a complete barrier to moisture. As such, while the parylene layer 1014 protects the scintillator needles/crystals forming layer 1008 from degradation from moisture as determined by the measured MTF of the array 1000, some moisture does come into contact with the scintillator layer 1008. This excess electronic noise causing the negative effects on the SNR is caused by dynamic charge coupling between the CsI scintillator layer 1008, the parylene layer 1014 and moisture disposed thereon in facilitated by the close proximity to the conductive data transfer lines in the photodiode/TFT array 1000.

Therefore, in order to make a CsI-based digital x-ray detector with stable image quality (MTF and SNR) over time, it is necessary to employ a further moisture barrier/sealing layer in conjunction with modified and/or additional layer(s) and/or component(s) in the detector structure and a shield layer to protect the data transfer lines.

BRIEF DESCRIPTION OF THE DISCLOSURE

This disclosure entails adding a shield layer between the photodiode/TFT array and the CsI-based scintillator/scintillator layer of a x-ray imaging detector in order to increase the useful life of the x-ray imaging detector. The shield layer prevents dynamic charge coupling between a CsI/parylene layer located above the shield layer and the conductive data transfer lines located below the shield layer to prevent premature degradation of various image quality parameters, e.g., MTF and SNR, thereby increasing the useful life of the detector by maintaining the desirable imaging properties of the x-ray imaging detector.

According to one exemplary embodiment of the disclosure, an x-ray imaging detector includes a photosensor including at least one photosensitive element, a data transfer line operably connected to the at least one photosensitive element, a second dielectric layer disposed over the data transfer line, a shield layer disposed on the second dielectric layer opposite the data transfer line and a scintillator layer disposed on the shield layer opposite the second dielectric layer.

In one exemplary embodiment of the invention, an x-ray imaging system includes an x-ray source, an x-ray imaging detector positioned to receive radiation emitted from the x-ray source through an object positioned between the x-ray source and the x-ray imaging detector, and a system controller operably connected to the x-ray source and the x-ray detector to control the operation of the x-ray source and the x-ray imaging detector, wherein the x-ray imaging detector includes a substrate, read out electronics disposed on the substrate and operably connected to the system controller, a photosensor disposed on the substrate and operably connected to the read out electronics, the photosensor comprising at least one photosensor element and a data transfer line operably connected between the at least one photosensor element and the read out electronics, a dielectric layer disposed on the substrate over the data transfer line and the at least one photosensor element, a shield layer disposed on the dielectric layer opposite the substrate over the data transfer line, and a scintillator layer disposed on the shield layer opposite the dielectric layer.

In another exemplary embodiment of the invention, a method of forming an x-ray imaging detector includes the steps of forming an array of photosensitive elements on a substrate layer, each photosensitive element including a photodiode and a thin film transistor, forming data transfer lines on the substrate layer, the data transfer lines operably connected to each of the photosensitive elements, forming a dielectric layer over the array of photosensitive elements and the data transfer lines, forming a shield layer over the dielectric layer, forming a scintillator layer over the shield layer, and forming a sealing layer over the scintillator layer.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 10A and 10B depict a top view and a side view of an embodiment of an x-ray imaging detector including an end cap, constructed according to the present disclosure.

FIG. 10C depicts a side view of an embodiment of an endcap with a backing substrate, read out electronics, and adhesive within the endcap.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Figure 1:
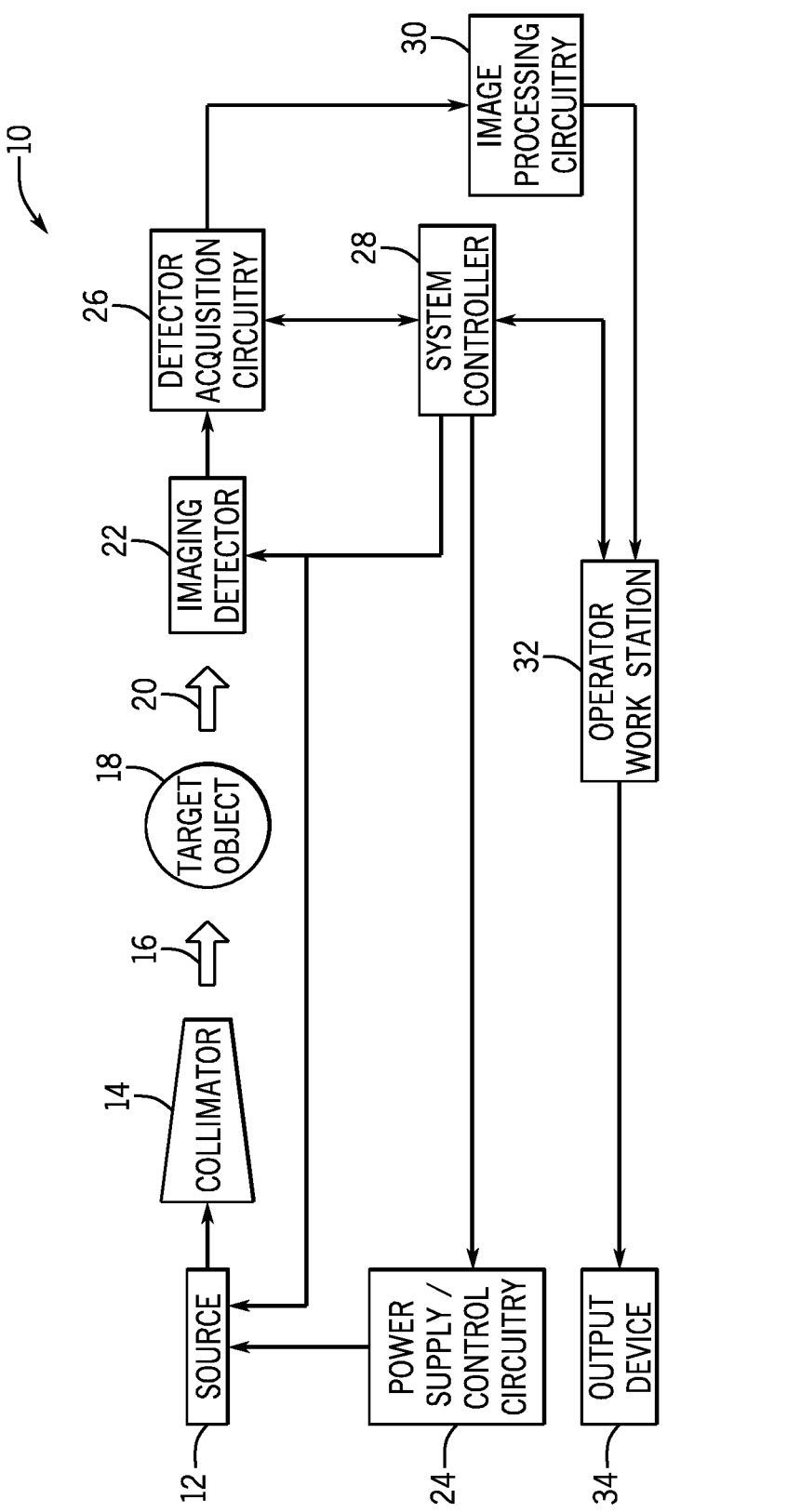
FIG. 1 is a block diagram of an imaging system in accordance with an exemplary embodiment of the present disclosure.

FIG. 1 illustrates a block diagram of an imaging system 10 in accordance with an exemplary embodiment of the present invention. The system 10 includes a source 12, a collimator 14, and an imaging detector. The source 12 is configured to generate a plurality of electromagnetic radiations 16. In some embodiments, the source 12 is a low-energy source employed for low energy imaging techniques, such as fluoroscopic techniques or the like. The collimator 14 is disposed aligned with the source 12 and configured to collimate the plurality of electromagnetic radiations 16. The collimator 14 is used to direct the plurality of electromagnetic radiations 16 emitted by the source 12 to a target object 18, such as, for example, a human patient. Some of the plurality of electromagnetic radiations 16 are attenuated by the target object 18 and at least some of attenuated electromagnetic radiations 20 impacts the x-ray imaging detector 22, for example, a fluoroscopic detector.

The x-ray imaging detector 22 may operate based on scintillation, i.e., optical conversion, direct conversion, or other techniques used for generation of electrical signals based on the incident electromagnetic radiations 20. For example, a scintillator-based imaging detector converts incident photons to optical photons. Such optical photons are then converted to electrical signals by employing photosensor(s), such as, for example, photodiode(s). If a direct conversion imaging detector is used, such a detector directly generates electrical charges in response to incident photons. The electrical charges can be stored and read out from storage capacitors. As described in detail below, electrical signals, regardless of the conversion technique employed, are acquired and processed to construct an image of the features (e.g., anatomy) of the target object 18.

Circuitry 24 is coupled to a source 12 and configured to provide electric power and control signals to the source 12. The x-ray imaging detector 22 is coupled to acquisition circuitry 26 configured to receive electrical readout signals generated by the x-ray imaging detector 22. The acquisition circuitry 26 may be further configured to execute various signal processing and filtration functions, such as, for example, initial adjustment of dynamic ranges to regulate an amount of radiations for imaging, digitally combining spatially shifted sub-images to construct a high-resolution composite image of the target, and so forth.

The circuitry 24 and the acquisition circuitry 26 are coupled to a system controller 28. The system controller 28 is configured to generate control signals for controlling the circuitry 24. In some embodiments, the system controller 28 can include signal processing circuitry, typically based upon a general purpose or application specific digital computer programmed to process signals based on one or more parameters of processing, such as for example, a ratio of pulse height of the signal to the energy of the electromagnetic rays incident on the imaging detector 22. The system controller 28 may also include memory circuitry for storing programs and routines executed by the computer, configuration parameters, image data, interface circuits, and so forth.

Image processing circuitry 30 is coupled to the acquisition circuitry 26 and configured to receive acquired projection data from the acquisition circuitry 26. The image processing circuitry 30 is configured to process the acquired projection data to generate one or more images of the target object 18 based on attenuation of photons.

A workstation 32 is communicatively coupled to the system controller 28 and the image processing circuitry 30 to initiate and configure imaging of the target object 18 and to view or print images generated from photons that impinge the imaging detector 22. For example, an operator may provide instructions or commands to the system controller 28 via one or more input devices associated with the workstation 32. The workstation 32 can receive and display or print an output of the image processing circuitry 30, using an output device 34 such as a display or printer. The output device 34 may include a standard or special purpose computer monitor and an associated processing circuitry. In some embodiments, at least one of the system controller 28, the image processing circuitry 30, and workstation 32 may be embodied in a single processor-based computing system.

Figure 2:
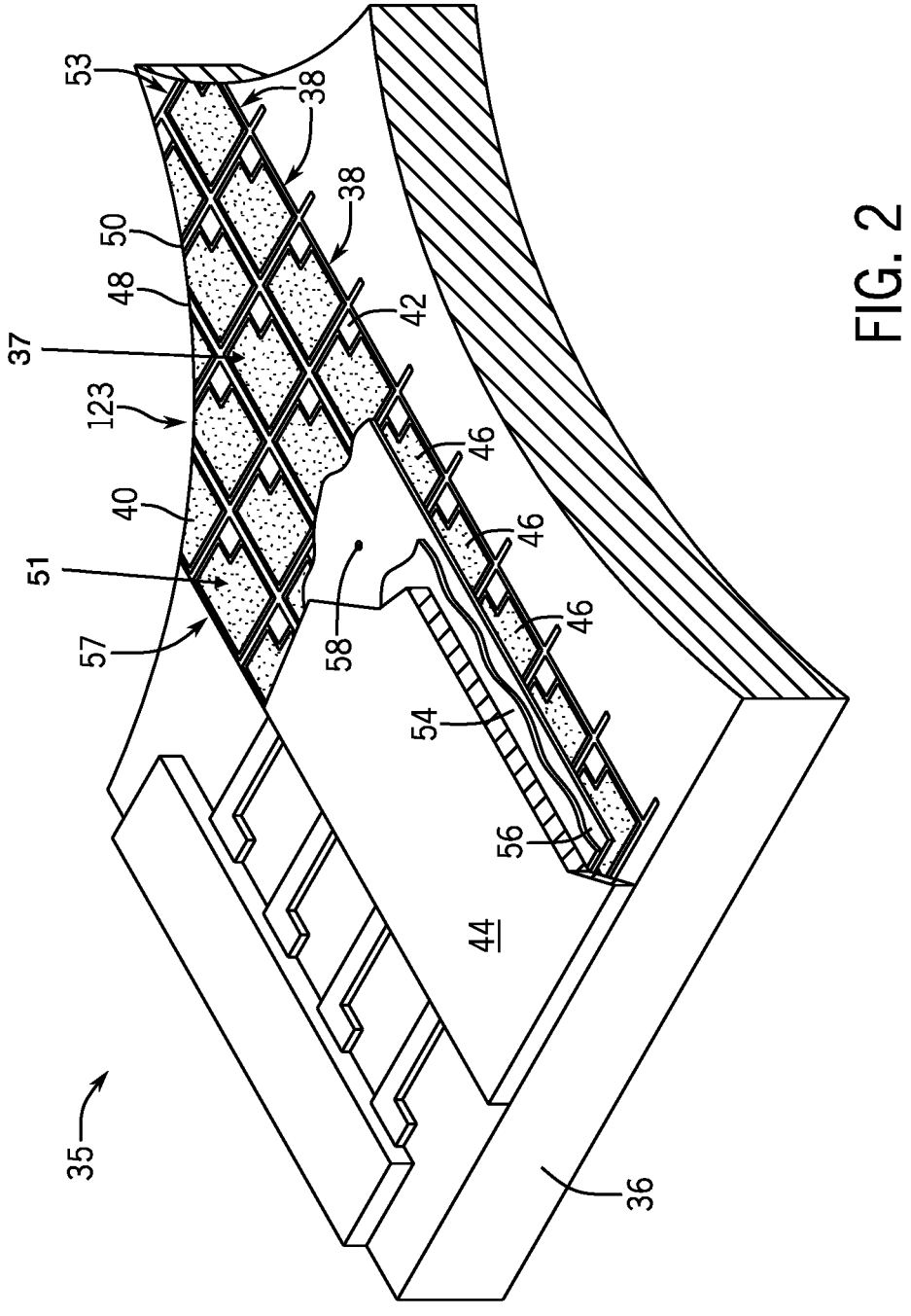
FIG. 2 is a partially broken away, isometric view of an x-ray imaging detector constructed according to the present disclosure.

Referring now to FIG. 2, a scintillation-based detector 35 suitable for use as the detector 22 depicted in FIG. 1 is described herein below. Though the scintillation-based detector 35 of FIG. 2 is discussed herein as an example for use with the present technique, it should be remembered that this is only one example. Discussion of the scintillation-based detector 35, therefore, should be understood to be merely exemplary and presented for the purpose of illustrating the principles of operation for one type of detector which may benefit from the present technique.

Turning again to FIG. 2, an exemplary physical arrangement of the components of a scintillation-based detector 35, such as those disclosed in U.S. Pat. No. 7,897,929, entitled Reduced Cost Pixel Design For Flat Panel X-ray Imager, which is expressly incorporated by reference herein in its entirety for all purposes, is presented in accordance with one embodiment of the disclosure. The detector 35 includes a glass substrate 36 on which the components described below are disposed.

In the depicted embodiment, the scintillation-based detector 35 includes a photosensor 37 form of an array of photosensor elements 38. In one implementation, the photosensor elements 38 are photodiodes 46 formed from silicon. In the exemplary embodiment of FIG. 2, the photodiodes 46 are arranged in an array 123 of rows 53 and columns 57 that define the pixels 51, or picture elements, read out by the detector acquisition circuitry 26 shown in FIG. 1. Each photodiode 46 includes a photosensitive region 40, and a thin film transistor (TFT) 42 such as an FET, which may be selectively activated using data lines 48 and scan lines 50.

Further, the scintillation-based detector 35 includes a scintillator 44, which, when exposed to X-rays, generates the optical photons detected by the photosensitive regions 40. As illustrated in this embodiment, a conductive layer 54 disposed on a dielectric layer 56 is disposed between the scintillator 44 and the array of photosensor elements 38. In one exemplary embodiment, vias 58 electrically couple the conductive layer 54 to each element of the array of photosensor elements 38 to allow a common bias to be applied to each photosensor element 38. Conductive layer 54 can be connected to the vias 58 outside of the array 123, where the vias 58 can be indirectly connected to each of the individual photosensor elements 38, such as through other circuitry (not shown) connecting the vias 58 to the photosensor elements 38, or inside of the array 123, where the vias 58 are directly connected to the conductive layer 54 and the photosensor elements 38.

Figure 3:
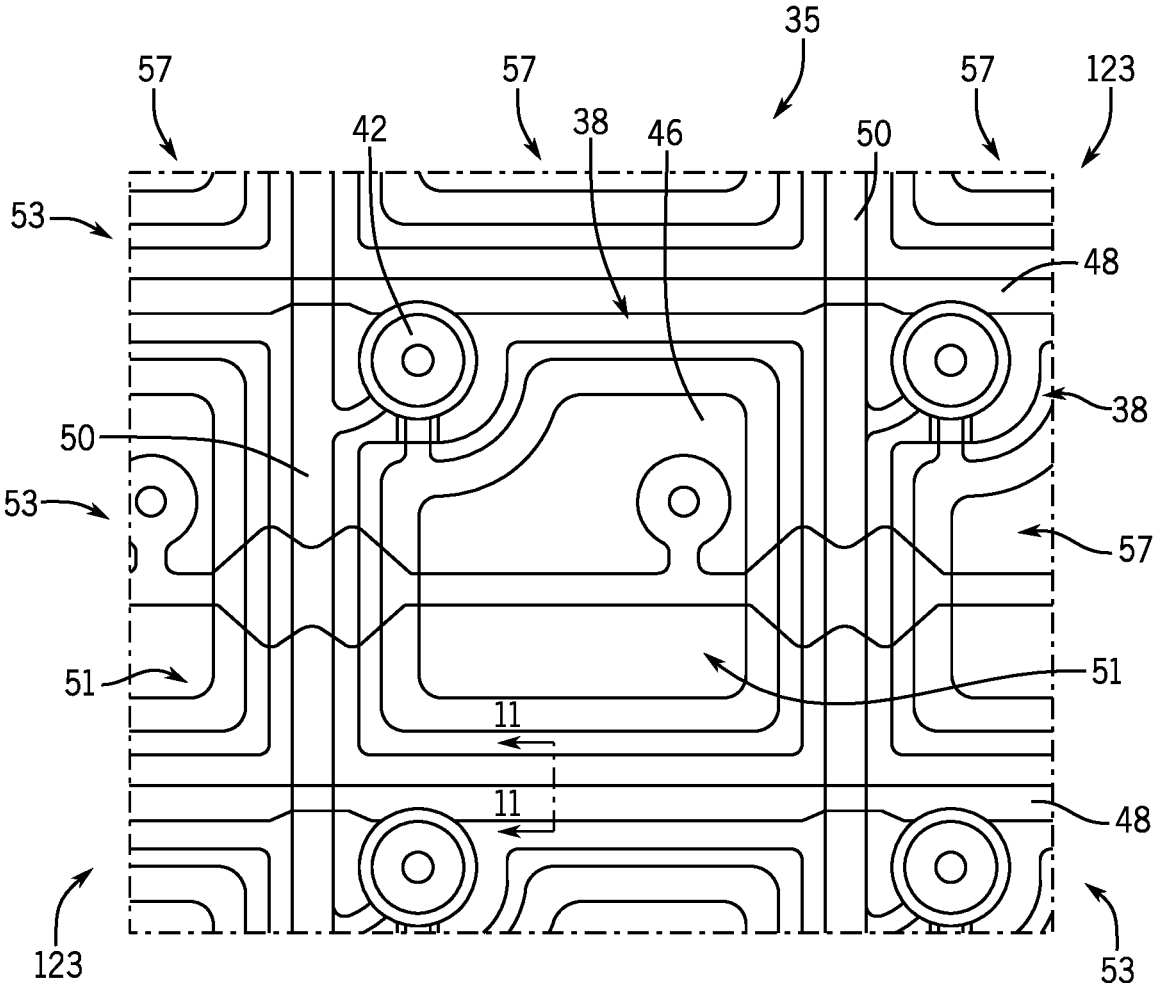
FIG. 3 is a partially broken away, top plan view of another x-ray imaging detector constructed according to the present disclosure.

Looking now at FIGS. 2 and 3, a partially broken away sectional view of the scintillation-based detector 35 is shown in accordance with an exemplary embodiment of the present invention. The scintillation-based detector 35 includes the data transfer lines 48 operably connected to the thin film transistors (TFTs) 42 forming part of the pixelated bottom electrodes or photodiodes 46 constituting the photosensor elements 38, and the scan lines 50. The data transfer lines 48, the photodiodes 46, and the scan lines 50 may be composed of metallic, dielectric, organic, and/or inorganic materials and in particular, data transfer lines 48 and scan lines 50 are formed from metallic materials, photodiodes 46 are formed of organic/inorganic materials, and insulator dielectric layers 122,124 (FIG. 11) are formed of dielectric materials. The various components 46,48,50, etc. of the detector 35 may be formed by one or more deposition techniques including, for example, plasma-enhanced chemical vapor deposition (PECVD), physical vapor deposition, electrochemical deposition, stamping, printing, sputtering, and/or any other suitable deposition techniques.

In one exemplary embodiment, each photosensitive element 38 constituting the photosensor 103 (FIG. 4A) includes a photodiode 46, at least one TFT 42 operatively coupled to at least one of the data transfer lines 48, at least one of the scan lines 50, and to at least one photodiode 46. In some embodiments, the photosensitive elements 38 form pixels 51 and are arranged in the form of a two-dimensional array 123 having rows 53 and columns 57. In such embodiments, the scintillation-based detector 35 includes an array of photosensitive elements 38 and plurality of data transfer lines 48.

In some other embodiments, the photosensitive elements 38 can be arranged in other configurations. For example, the photosensitive elements 38 can be arranged in a honeycomb pattern. The spatial density of the photosensitive elements 38 is defined based on a quantity of the pixels 51 in the array, physical dimensions of the pixel array, pixel density or resolution of the scintillation-based detector 35.

Each data transfer line 48 is in electrical communication with an output of the TFTs 42 of at least one of the photosensitive elements 38. For example, each data transfer line 48 is associated with a row 53 or a column 57 of the TFTs 42 for the associated photosensitive elements 38. An output (e.g., source or drain) of each TFT 42 in the corresponding row or column is in electrical communication with the corresponding data transfer line 48. The data transfer lines 48 carry charge from each photodiode 46 of the photosensitive elements 38 to external charge integrating amplifiers (not shown) and A-to-D converters (not shown) in order to create a digital pixelated image. These data transfer lines 48 are extremely susceptible to interferences such as electronic noise generated from the surrounding environment for the data transfer lines 48. Such interferences can affect data signals transmitted along the data transfer lines 48. Electronic noise may also be introduced on the data transfer lines 48 due to capacitive coupling of conductive components in the scintillation-based detector 35, e.g., electronic charge coupling from any nearby source(s), which must be kept well below 1 femto-coulomb. The data transfer lines 48 may be formed of a conductive material, such as a metal, and configured to facilitate transmission of electrical signals, corresponding to incident photons, to the image processing circuitry.

The scan lines 50 are in electrical communication with inputs (e.g., gates) of the TFTs 42 of each photosensitive element 38. For example, each scan line 50 is associated with a column 57 or row 53 of the TFTs 42 of the photosensitive elements 38. The input of each TFT 42 in the corresponding row or column of photosensitive elements 38 is in electrical communication with the corresponding scan line 50. Electrical signals transmitted along the scan lines 50 are used to control the TFTs 42 of the photosensitive elements 38 to output data such that the data flows through the corresponding data transfer lines 48. In certain exemplary embodiments, the scan lines 50 and the data transfer lines 48 may extend perpendicularly to each other to form a grid corresponding to the array 123. The scan lines 50 may be formed of a conductive material, such as a metal, and configured to facilitate transmission of electrical signals from the system controller to the inputs of the TFTs 42.

As described in U.S. Pat. No. 6,396,046, entitled Imager With Reduced FET Photoresponse And High Integrity Contact Via, the entirety of which is expressly incorporated herein by reference for all purposes, different embodiments of various material layers can be employed to form the scintillator-based detector 35 depicted in FIGS. 4-10 help to address problems such moisture ingress through materials and dynamic charge coupling which result in the degradation of different image quality parameters for the scintillation-based detector 35.

Figure 4A:
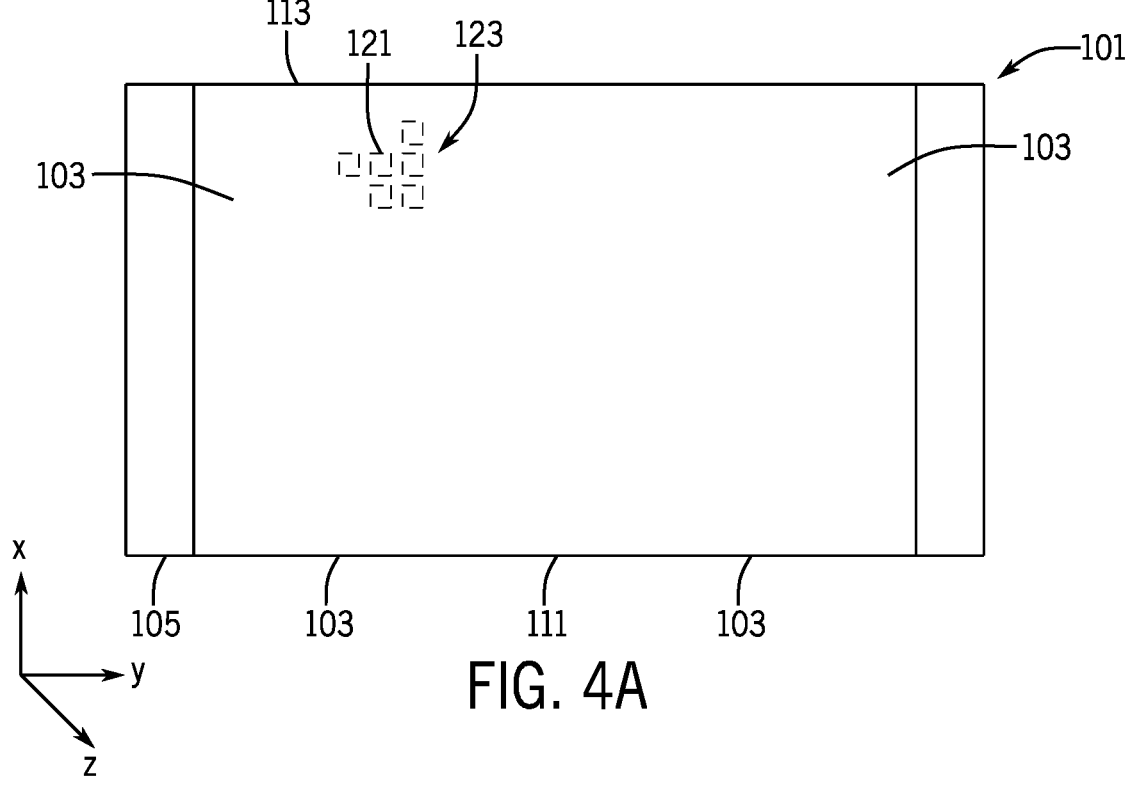
FIGS. 4A and 4B depict a top view and a side view of an embodiment of an x-ray imaging detector including an array of photosensitive elements, electronics, and a substrate, constructed according to the present disclosure.
Figure 4B:
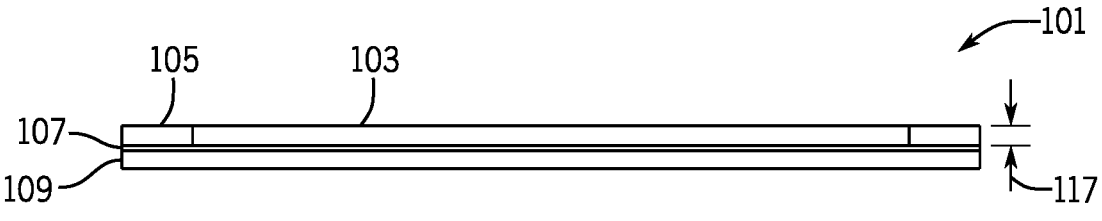

FIGS. 4A and 4B depict an embodiment of an x-ray imaging detector 101 employed with the imaging system 10 and comprising a photosensor 103, read out electronics 105, an optional adhesive layer 107, and a backing substrate 109. The photosensor 103 may also be referred to as an imaging panel or other similar terminology, and in an alternative embodiment more than one photosensor 103 can be disposed on the x-ray imaging detector 101.

FIGS. 4A and 4B depict an axis system that will be used to describe embodiments of the application. The x-axis and y-axis extend in perpendicular directions of which the x-ray imaging detector 101 extends. The z-axis extends perpendicular to the x-axis and y-axis and extends through the x-ray imaging detector 101 perpendicular to a top and bottom face of the x-ray imaging detector 101.

Photosensor 103 may be formed of many types of light imaging devices and materials including silicon-based complementary metal oxide semiconductor (CMOS). CMOS designs provide high-quality imaging but present manufacturing challenges because silicon based panels may only be formed to certain dimensions. A detecting area 113 may be composed of the total area of photosensor 103 in an x-direction and y-direction and may have dimensions of up to approximately 50×50 cm. Other shapes for the photosensor 103 may also be used, such as rounded or square. Photosensor 103 may have a thickness 117 in a z-direction of approximately 100-500 μm.

A number of pixels 121 are depicted schematically in FIG. 4A. A pixel is the smallest element within the photosensor 103 such that the photosensor 103 comprises an array 123 of pixels 121 that are each formed with the general structure of the pixels 51 (FIG. 3), each pixel 121 including at least one TFT 42 operatively coupled to at least one of the transfer data lines 48, at least one of the scan lines 50, and to at least one photodiode 46. The data transfer lines 48 and the scan lines 50 are each operatively connected to the read out electronics 105 in order to enable data transmission from the photosensor 103 to the imaging system 10.

Photosensor 103 is mounted onto a backing substrate 109 similar to substrate 36 (FIG. 2) in any suitable manner, such as by using an adhesive 107. Embodiments of the application may use many types of backing substrates and adhesives to support the photosensor 103. Backing substrate 109 may be composed of glass, metal, composites, plastic, metal alloy or a combination of materials. Adhesive 107, when utilized, may be composed of many types of materials and will depend on the photosensor 103 and backing substrate 109 being used. The thickness of the backing substrate 109 and adhesive 107 will vary depending on application and materials used. For example, a portable unit may use a thinner backing substrate to conserve weight. The area dimensions, depicted in the x-axis and y-axis, of the backing substrate and adhesive will be approximately the total area of the photosensor 103 and read out electronics 105.

Read out electronics 105 process signals transmitted from the connected photosensor 103, i.e., the pixels 121 and associated photodiodes and TFTs forming each pixel 121. Read out electronics 105 are operably connected to the data lines and scan lines associated with the array 123 of pixels 121 in the photosensor 103 and may include circuits designed to processes the signal or a processor and memory storing instructions for processing signal of photosensor 103. The read out electronics 105 are mounted on the backing substrate 109 adjacent to the photosensor 103. The read out electronics 105 may be positioned in many different configurations relative to the photosensor 103 without departing from the scope of the application. The read out electronics 105 may have length dimensions, depicted in the x-direction and y-direction, between approximately 2-50 cm, depending on application. The thickness of the read out electronics 105, depicted in the z-direction may be similar to that of the photosensor 103 but need not be.

Many methods and materials for x-ray imaging exists including direct conversion with selenium and cadmium zinc telluride component. Indirect conversion with cesium iodide (CsI) or gadolinium oxisulfide (GOS) scintillator and light imaging components of amorphous silicon flat panel or crystalline silicon (CMOS) components may also be used. A combination of CMOS and CsI has potential to offer high image quality in comparison to alternative materials.

Figure 5A:
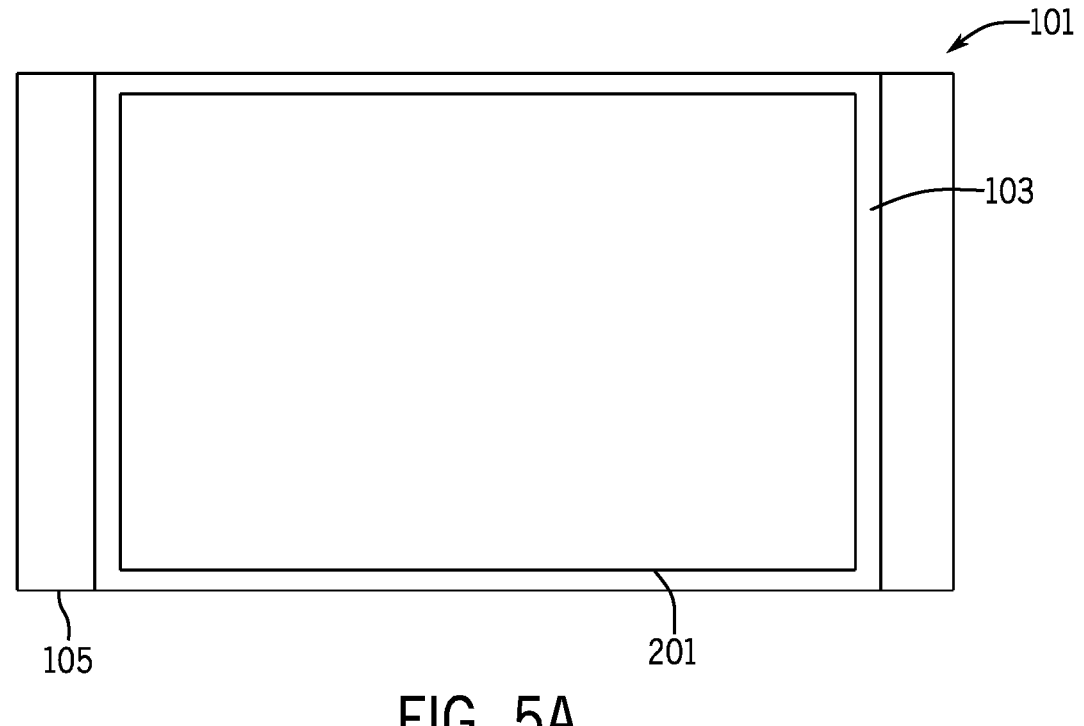
FIGS. 5A and 5B depict a top view and a side view of an embodiment of an x-ray imaging detector including a barrier layer applied to the array of photosensitive elements, constructed according to the present disclosure.
Figure 5B:
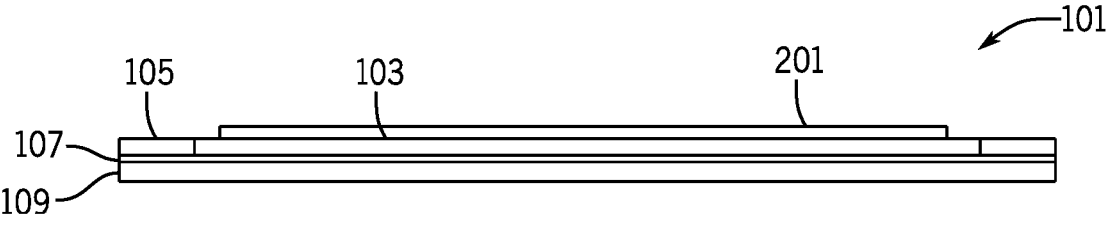

X-ray sensitive or scintillator materials may degrade when contacted by water and other problematic materials. In other words, many scintillator materials are moisture sensitive. To address the moisture problem, as shown in FIGS. 5A and 5B depict an embodiment of an x-ray imaging detector 101 with an optional barrier layer 201 applied. The barrier layer 201 reduces the permeation rate of water vapor/moisture and other unwanted materials through the barrier layer 201. When present, the barrier layer 201 is applied onto at least the photosensor 103. In some embodiments, the barrier layer 201 covers the read out electronics 105 while in other embodiments the barrier layer 201 does not. Therefore, the area dimensions of the barrier layer 201, depicted in the x-axis and y-axis, may be a function of the area of components such as photosensor 103.

In some embodiments of the present application, the barrier layer 201 contacts the adhesive layer 107 while in other embodiments the barrier layer 201 contacts the backing substrate 109. The thickness of the barrier layer 201 may be less than 10 μm. In embodiments were the barrier layer 201 is comprised of two or more individual layers, the total thickness may still be less than 10 μm.

The barrier layer 201 may also contain a leveling coating with a planarizing function. The leveling coating may contain at least one resin. The resin may be an epoxy based resin, such as a cycloaliphatic resin, or an acrylic based resin. The composition of the leveling coating may further include at least one agent which makes the leveling coating more flexible, at least when applied. This agent may be referred to herein as a flexibilizing agent. The composition of the barrier layer 201 may also include an adhesion promoter, surfactant, catalyst and combinations of the aforementioned components. Embodiments of the composition may be composed of or of a form of parylene or aluminum oxide ($Al_2O_3$). The barrier layer 201 may also include components that prevent or retard moisture water vapor and other problematic substances from passing through the barrier layer 201. These properties of the barrier layer may form a protective structure with a perimeter seal and diffusion resistant layer around a scintillator.

The barrier layer 201 may reduce diffusion rates of chemical species through the layer. The substantially impermeable material may comprise a single discrete zone comprised of a material that reduces diffusion, or a multilayer structure of materials that reduce diffusion, or a material with a composition that varies across a thickness of the layer. Materials that prevent substances or materials from passing through them may be referred to herein as a "diffusion-barrier material."

Figure 6A:
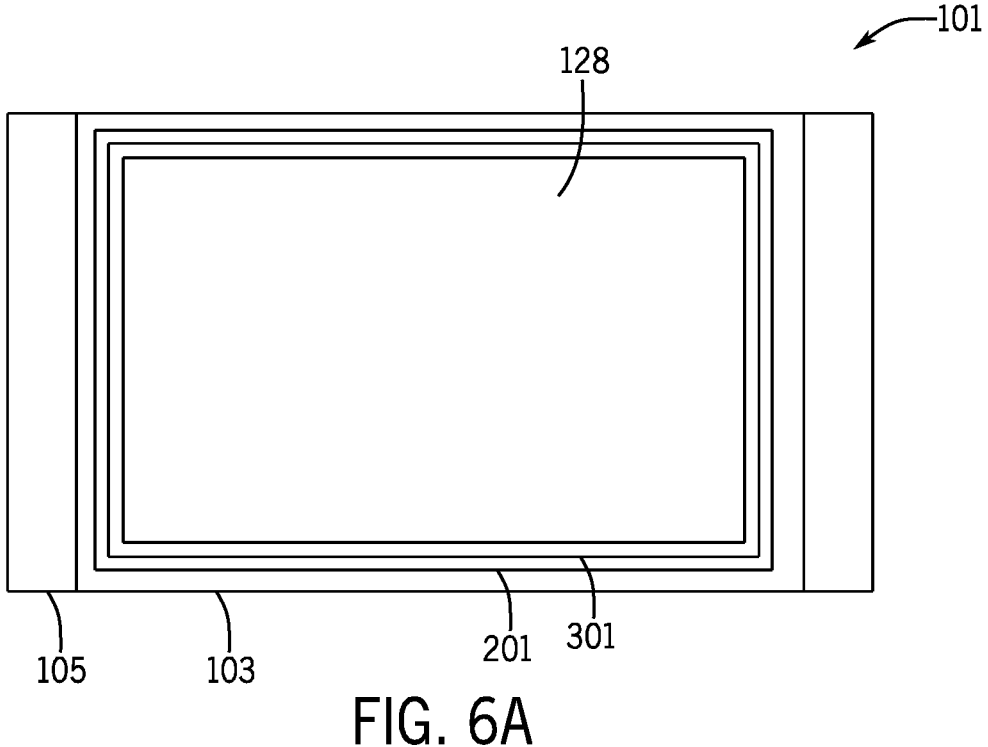
FIGS. 6A and 6B depict a top view and a side view of an embodiment of an x-ray imaging detector including a scintillator layer applied to a barrier layer, constructed according to the present disclosure.
Figure 6B:
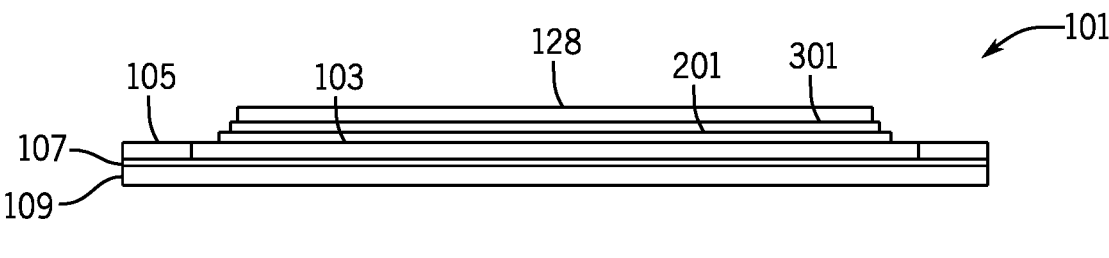

FIGS. 6A and 6B depict an embodiment of an x-ray imaging detector 101 including a scintillator layer 301 positioned on top of barrier layer 201. In addition to or as an alternative to the barrier layer 201, the detector 101 can include a sealing layer 128 formed similarly to the barrier layer 210, but disposed over the top of the scintillator layer 310. The scintillator layer 301 may be deposited directly onto barrier layer 201 or deposited onto another surface and moved onto the barrier layer 201. The scintillator layer 301 thickness, depicted in the z-axis, will vary depending on application and material used and can range from 100-1000 μm. The scintillator layer 301 may have area dimensions, depicted in the x-axis and y-axis, smaller than that of barrier layer 201 so that a perimeter seal may be applied outside of the scintillator layer 301.

The scintillator layer 301 may be composed of one or more of many x-ray sensitive materials including phosphors, cesium iodide (CsI), gadolinium oxisulfide (GOS). Scintillator materials are commonly moisture sensitive and performance of an imager may degrade over time as moisture moves into scintillator materials. Therefore, embodiments of the application make use of structures such as the barrier layer 201, perimeter seals and diffusion resistant layer to prevent or slow the rate of moisture entering the scintillator materials. To apply the sealing layer 128 over the top of the scintillator layer 301, as the top surface of the scintillator layer is extremely complex and non-planar (i.e., a needle structure with sub-micron gaps between needles), a vapor deposition of parylene or an atomic layer deposition of $Al_2O_3$ can be used to coat the needles forming the scintillator layer 301.

Figure 7A:
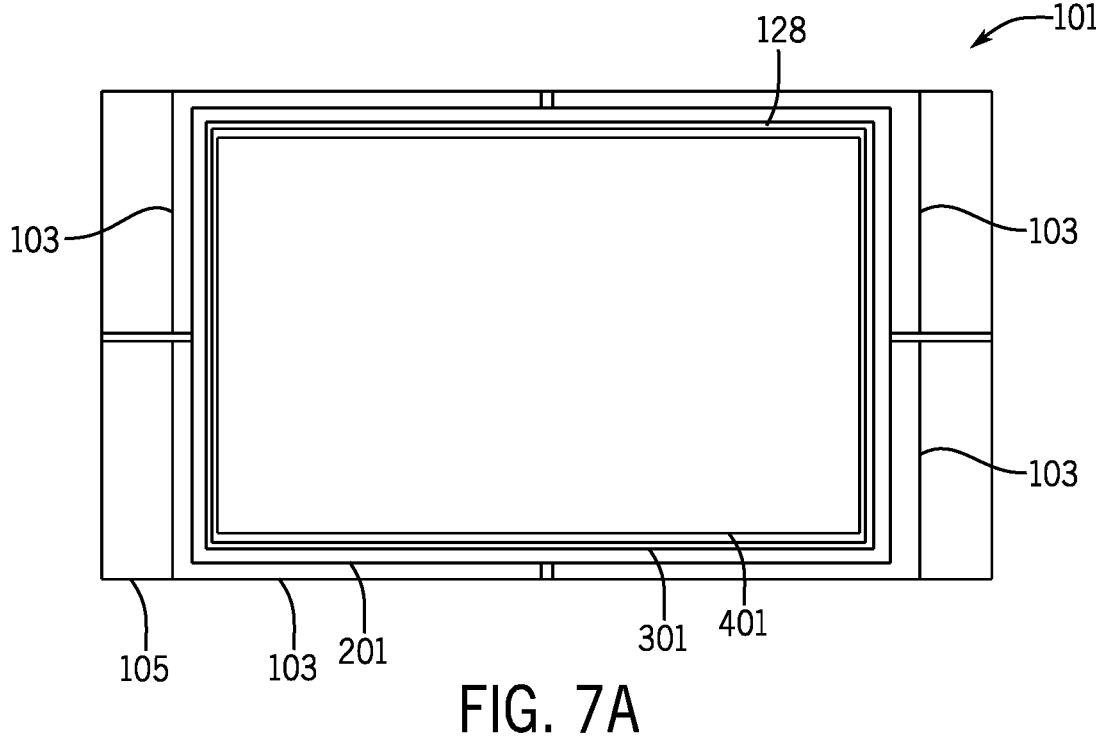
FIGS. 7A and 7B depict a top view and a side view of an embodiment of an x-ray imaging detector including a reflector layer applied to a scintillator layer, constructed according to the present disclosure.
Figure 7B:
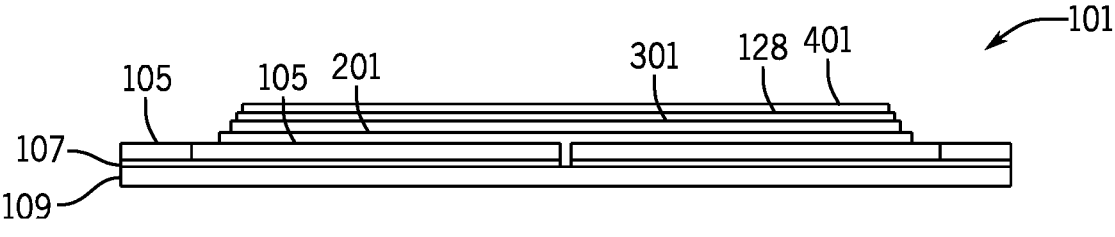

FIGS. 7A and 7B depict an embodiment of an x-ray imaging detector 101 including reflective layer 401 positioned on the sealing layer 128 over the scintillator layer 301. Embodiments of the reflective layer may be a diffuse or spectral reflective layer comprised of an organic or inorganic material with greater than 75% reflection in the optical spectrum.

The dimensions of reflector layer 401 will vary depending on application. In embodiments where the reflective layer 401 is within a perimeter seal, then the area dimensions, depicted in the x-axis and y-axis, will be smaller than the interior surfaces of the perimeter seal. Similarly, the area dimensions of reflective layer 401 may also be dictated by the sealing layer 128 and the scintillator layer 301 in embodiments where reflective layer 401 is positioned on the sealing layer 128 over the scintillator layer 301. The thickness of reflective layer 401, depicted in the z-axis, will vary depending on application and materials used and may range from approximately 0.1-0.3 mm.

Figure 8A:
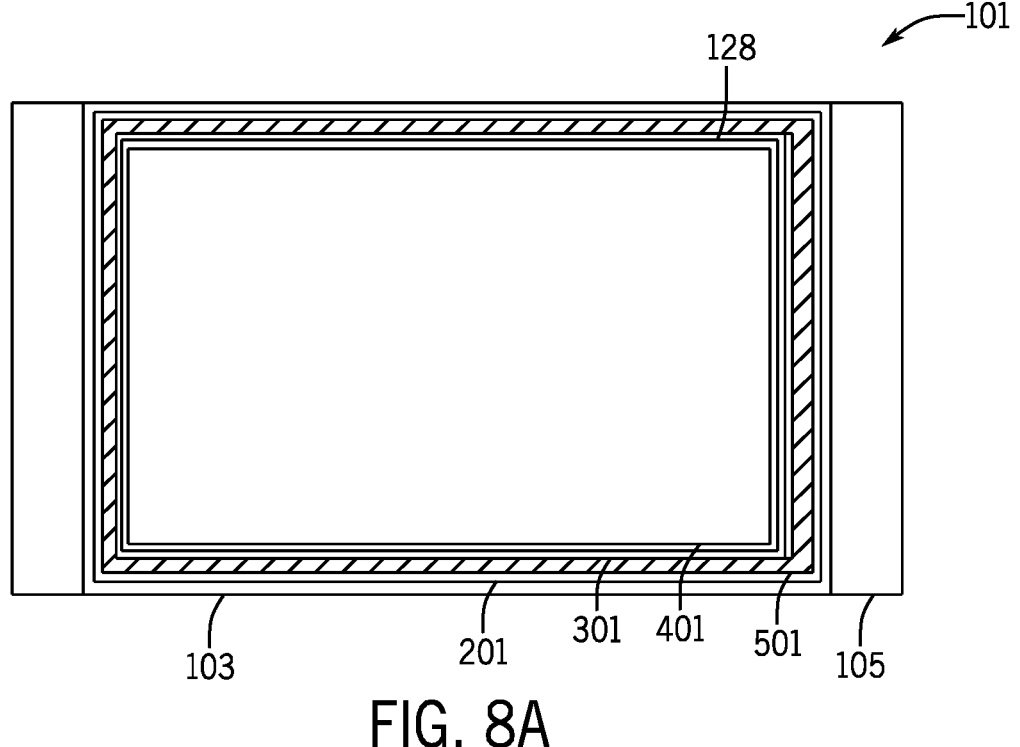
FIGS. 8A and 8B depict a top view and a side view of an embodiment of an x-ray imaging detector including a perimeter seal applied around other layers, constructed according to the present disclosure.
Figure 8B:
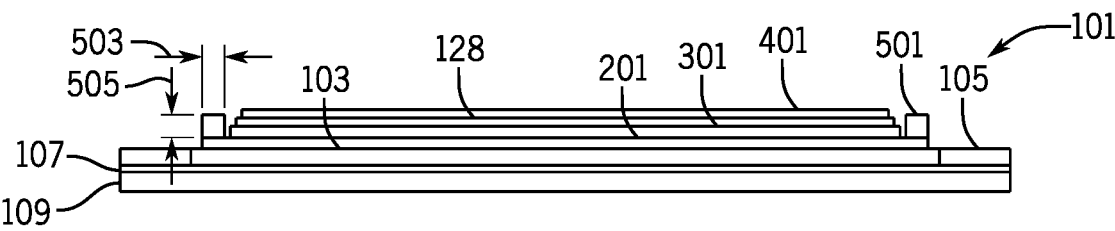

FIGS. 8A and 8B depict an embodiment of an x-ray imaging detector 101 including a perimeter seal 501 positioned on a barrier layer 201 and exterior to scintillator layer 301 and reflector layer 401. As noted in the description in FIGS. 4A and 4B, the barrier layer 201 may exhibit moisture barrier qualities. Thus, the perimeter seal 501 and barrier layer 201 may act to prevent moisture from reaching the scintillator layer 301. In other embodiments, the perimeter seal 501 may be positioned on a component besides the barrier layer 201 but in contact with exterior surfaces of the barrier layer 201.

The perimeter seal 501 may be composed of many diffusion resistant materials such as epoxies, polyurethanes, silicones and combinations thereof. These materials may prevent water and other problematic molecules from diffusing through them. Epoxies of the perimeter seal 501 may include bisphenol-based epoxy, aliphatic epoxy, halogenated epoxy, glycidylamine epoxy, epoxy, acrylates epoxy, and cationic epoxy.

Dimensions of embodiments of the perimeter seal 501 will vary depending on components such as the barrier layer 201, scintillator layer 301 and any layers within the boundary of the perimeter seal 501. In embodiments where the perimeter seal 501 is positioned on barrier layer 201, the exterior area dimensions of the perimeter seal 501, depicted in the x-axis and y-axis, will be approximately the same or less than the barrier layer 201. Similarly, in embodiments where the scintillator layer 301 is within the perimeter seal 501, the interior area dimensions of the perimeter seal 501, depicted in the x-axis and y-axis, will be greater than the area dimensions of the scintillator layer 301.

The width 503 of perimeter seal 501 will depend on the application and materials used. As discussed above, the exterior and interior area dimensions of the perimeter seal 501 vary depending on dimensions of components such as the barrier layer 201 and scintillator layer 301. Therefore, the width 503 of the perimeter seal 501 will vary depending on these exterior and interior area dimensions. An approximate width 503 of the perimeter seal 501 may be between 1-10 mm.

Similarly, thickness 505 of perimeter seal 501 will vary depending on the components within the perimeter seal 501. As will be discussed in FIGS. 9A and 9B, a diffusion resistant layer is positioned on perimeter seal 501. Therefore, the thickness 505 of perimeter seal 501 is approximately the same as or greater than a sum of the thickness of the components within the perimeter seal 501. In the embodiment depicted in FIG. 8B, the thickness 505 is the sum of the thickness of scintillator layer 301 and reflector layer 401. An approximate range for the thickness 505 of perimeter seal 501 may be between 0.1-1 mm.

Figure 9A:
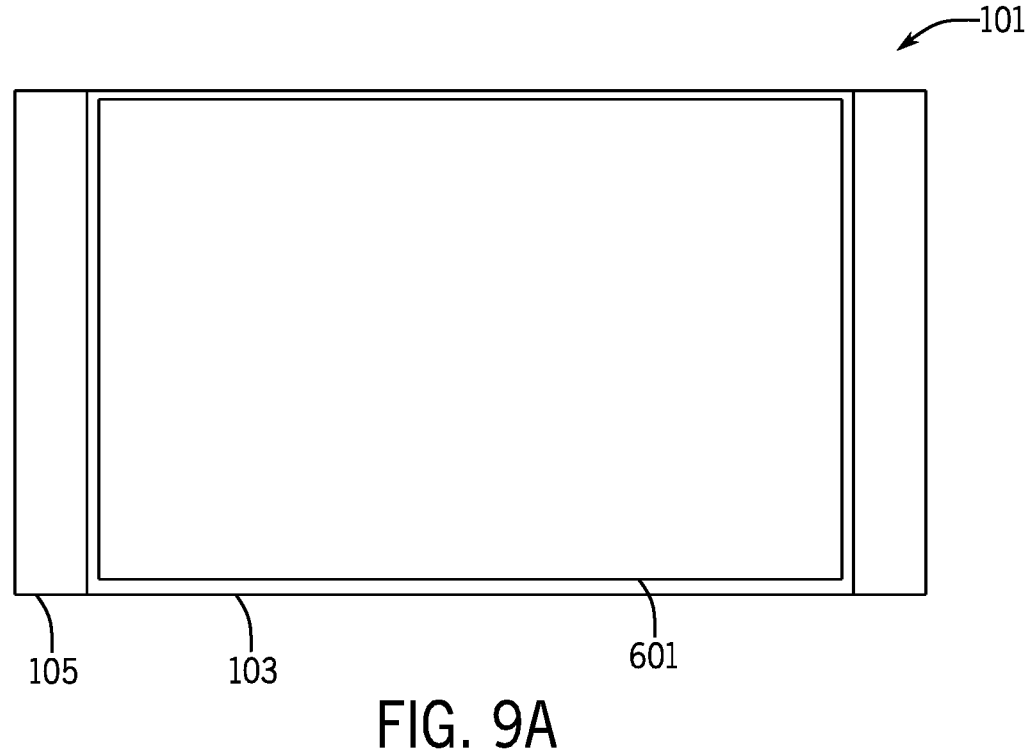
FIGS. 9A and 9B depict a top view and a side view of an embodiment of an x-ray imaging detector including a diffusion resistant layer applied to other structures including a perimeter seal, constructed according to the present disclosure.
Figure 9B:
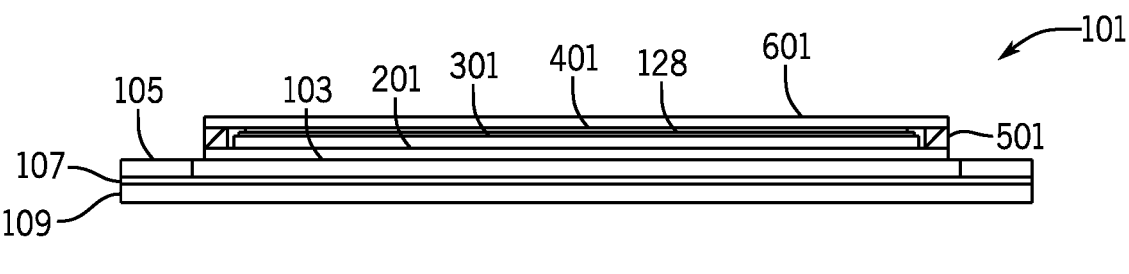

FIGS. 9A and 9B depict an embodiment of an x-ray imaging detector 101 including a diffusion resistant layer 601 positioned on perimeter seal 501. In one embodiment, the diffusion-resistant layer 601 is formed as a stiff carbon fiber sheet that has a thin film of aluminum laminated onto both sides. The diffusion-resistant layer 601 is bonded to the perimeter seal 501, such using an epoxy, but does not make contact with the reflective layer 401, the sealing layer 128 or the scintillator 301, as the diffusion-resistant layer 601 is suspended above the sealing layer 128, the scintillator layer 301 and the reflective layer 401. The diffusion resistant layer 601 may be composed of many diffusion resistant materials such as metal, glass, composites and combinations thereof. These materials may specifically prevent or slow down diffusion of water and other problematic substances. As can be seen in FIG. 8B, the diffusion resistant layer 601, perimeter seal 501, the sealing layer 128 and barrier layer 201 may form a moisture or vapor resistant layer surrounding the scintillator layer 301. Thus, embodiments of scintillator layer 301 that include moisture sensitive materials may be protected from exposure and degradation.

The area dimensions of diffusion resistant layer 601, depicted in the x-axis and y-axis, vary depending on dimensions of perimeter seal 501. Thus, the dimensions of diffusion resistant layer 601 will be similar to the outer area dimensions of perimeter seal 501 but may be greater than or less than the dimensions depending on surrounding structures. The thickness of diffusion resistant layer 601 will vary depending on application and materials used. The thickness of diffusion resistant layer 601 may vary between approximately 0.1-3 mm.

FIGS. 10A and 10B depict an imaging device 707 including an embodiment of an x-ray imaging detector 101 including endcaps 705 positioned around an exterior of components such as the diffusion resistant layer 601 and backing substrate 109. The endcaps 705 may serve to provide structural support for other components of the x-ray imaging detector 101. The endcaps 705 may also serve to provide an area for handling of the x-ray imaging detector 101. Endcaps 705 may extend along any number of sides of the x-ray imaging detector 101 including only one side or around all four sides. The area dimensions, depicted in the x-axis and y-axis, and thickness dimensions of endcaps 705, depicted in the z-axis, will vary depending on application and materials used. However, the endcaps 705 extends along a perimeter of the x-ray imaging detector 101 and therefore interior dimensions of the endcap will be dictated by exterior dimensions of other layers of x-ray imaging detector 101. For example, interior dimensions of the endcaps 705 may be the sum of the thickness of the other layers of the x-ray imaging detector 101. FIG. 10C depicts the backing substrate 109, read out electronics 105, and adhesive 107 within an endcap 705.

With regard to the embodiments of each of FIGS. 4A-10B, the detector 101 can be formed with various combinations of the layers of materials over the photosensor 103

Figure 11:
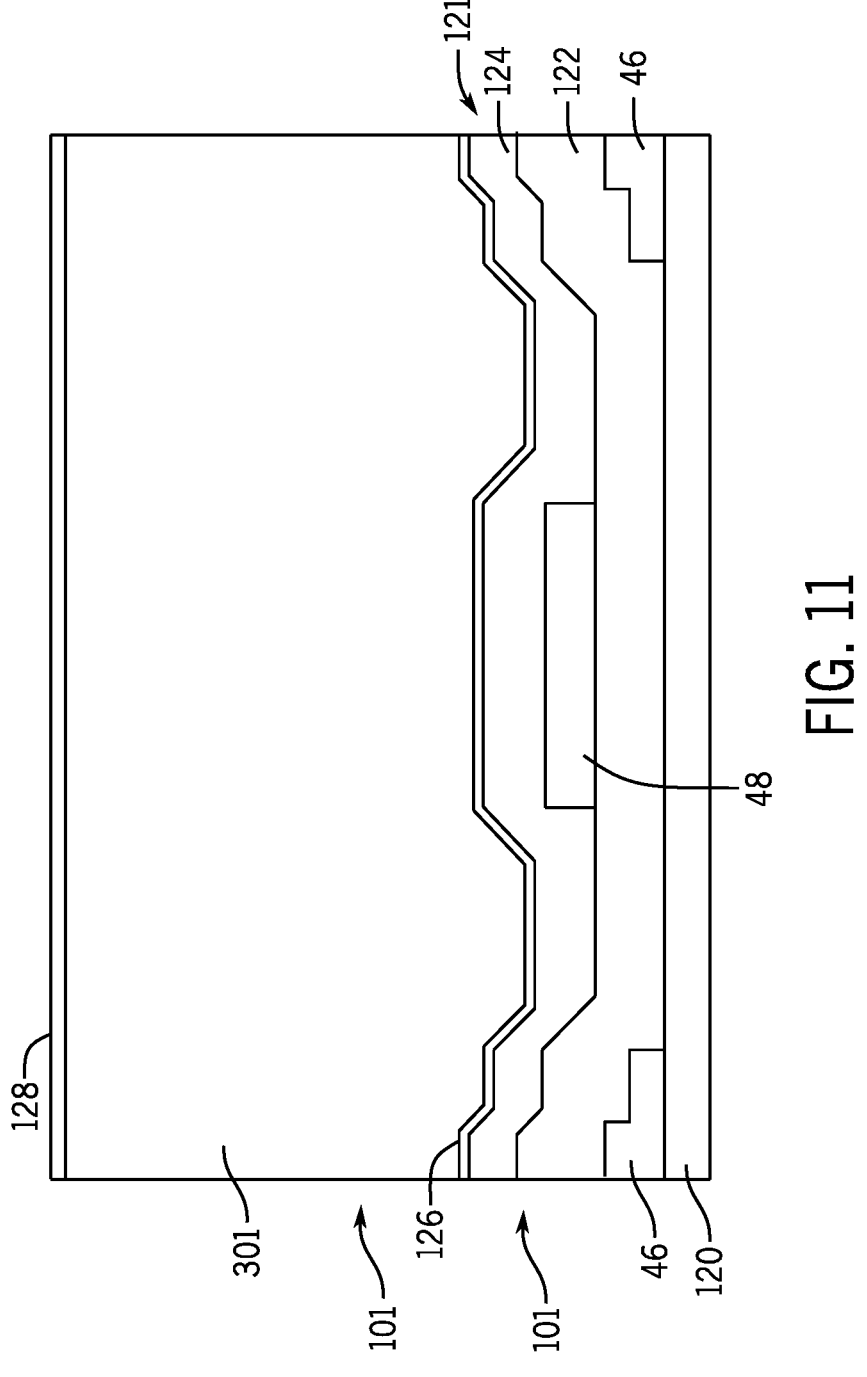
FIG. 11 is a cross-sectional view along line 11-11 of FIG. 3.

With reference now to FIGS. 2, 3 and 11, in an exemplary illustrated embodiment of the x-ray imaging detector 101, the photosensor 103 is formed with or as part of an array 123 of between 1000×1000 to 4000×4000 pixels 121, with each pixel 121 being generally square in shape with each side between about 50 μm to about 200 μm in length. The pixels 121, each including the photodiode 46 and the TFT 42, are operably connected to data transfer lines 48 and scan lines 50 each running the length or width of the array 123. The data transfer lines 48 and scan lines 50 are each operably connected to the read out electronics 105 in order to transmit and receive electronic signals to and from each pixel 121.

As illustrated in FIG. 11, which is a cross-section of the x-ray imaging detector 101 centered on a data transfer line 48 of the array 123, the x-ray imaging detector 101 includes a substrate 120 formed similarly to backing substrate 109, e.g., a glass substrate, on which are located and/or formed photosensor 103 including the array 123 of photosensitive elements 38 or pixels 51/121, each including a photodiode 46 and a TFT 42, Substrate 120 can additionally include one or more first dielectric layers 122 of a dielectric material to support the photosensitive elements 38/pixels 121 and data transfer line(s) 48 and scan line(s) 50 on the substrate 120. The x-ray imaging detector 101 further includes a second dielectric layer 124 of a dielectric material disposed over the substrate 120, the one or more first dielectric layers 122 and the data transfer line 48. The first and second dielectric layers 122,124, as well as the data transfer line 48 and the photosensitive element 38 including the photodiode 46 and the TFT 42, can be composed of metallic, dielectric, organic, and/or inorganic materials and may be formed by deposition techniques including, for example, chemical vapor deposition, physical vapor deposition, electrochemical deposition, stamping, printing, sputtering, and/or any other suitable deposition techniques.

Above or over the second dielectric layer 124 and opposite the substrate 120 is disposed a shield layer 126. The shield layer 126 is formed from a transparent conductive material that is grounded to an external power supply (not shown) in order to control or eliminate the electrical coupling of the scintillator 301 with the data transfer lines 48, among other components of the array 123. In one exemplary embodiment, the shield layer 126 is formed of a transparent indium-tin-oxide (ITO) material deposited on top of the second dielectric layer 124, at least over the data transfer lines 48, with a thickness of between about 0.05 μm to about 1.0 μm, and more specifically about 0.07 μm, in order to provide a conductive shield over the data transfer lines 48 on the photosensor 103. Above the shield layer 126 is disposed the scintillator layer 301, which in the illustrated exemplary embodiment of FIG. 11 is formed of CsI. Further, a transparent sealing layer 128 is disposed on the scintillator layer 301 opposite the shield layer 126, where the transparent sealing layer 128 is moisture diffusion/barrier layer formed of a suitable material, such as parylene or aluminum oxide.

With this configuration for the x-ray imaging detector 101 having the shield layer 126 disposed between the scintillator layer 301 and the second dielectric layer 124, the shield layer 126 prevents dynamic charge flows in the scintillator layer 301, i.e., CsI, from coupling to the data transfer lines 48. In one particular exemplary embodiment, the second dielectric layer 124 is thickened to between about 2 μm and about 6 μm, or in another particular exemplary embodiment to between about 3.5 μm and about 4.5 μm and more particularly about 4.0 μm, at least over the data transfer lines 48 in order to effectively control the capacitance of this shield layer 126. This increased at least partial thickness of the second dielectric layer 124 is approximately five (5) times the standard thickness of 0.7 μm for the second dielectric layer 124 disposed over the data transfer lines 48 in prior art x-ray imaging detectors 101/photosensors 103.

Figure 12:
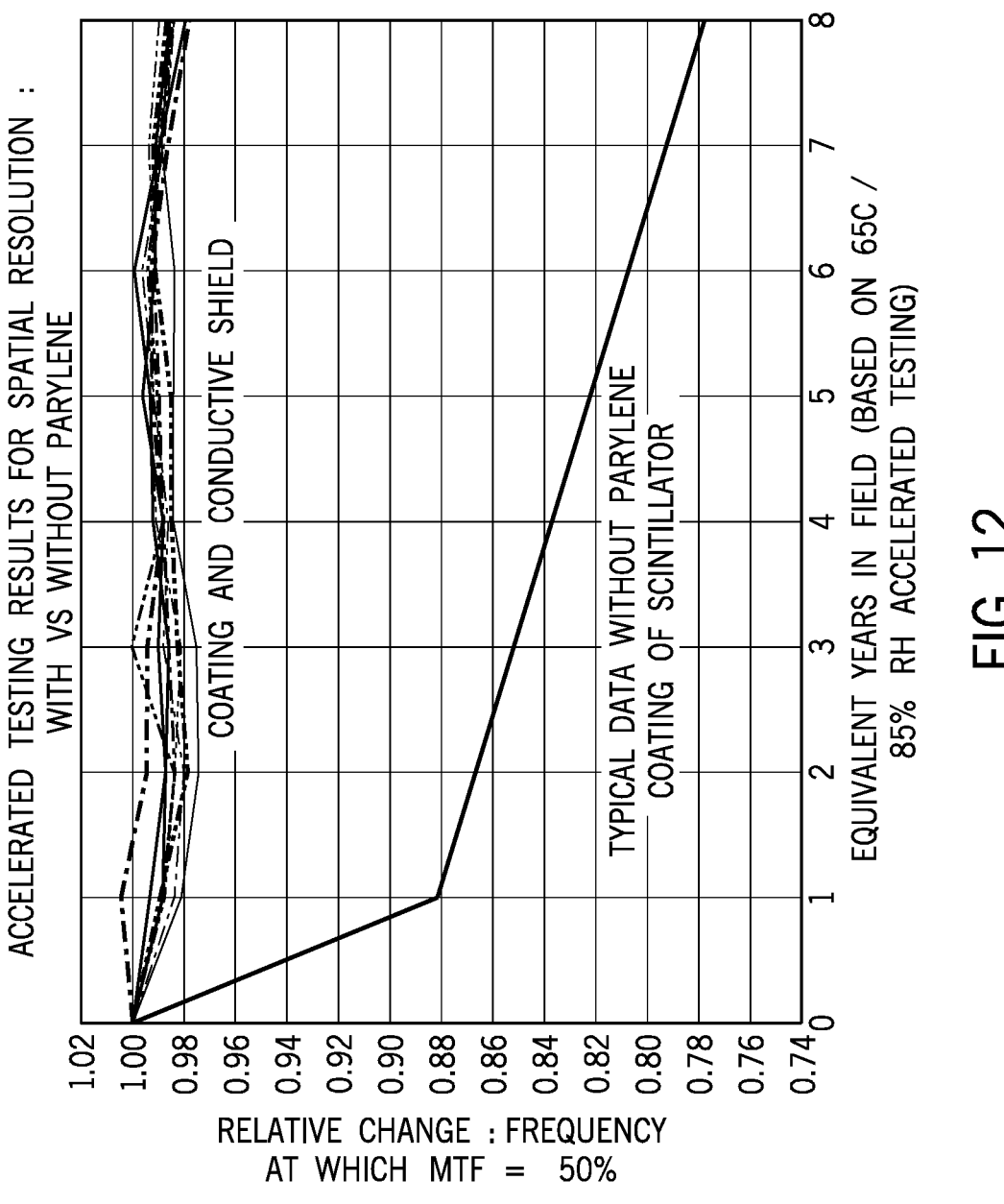
FIG. 12 is a graph of spatial resolution versus time for a detector constructed with the shield layer according to the present disclosure.

With the disclosed construction for the x-ray imaging detector 101 including the shield layer 126 between the scintillator layer 301 and the data transfer lines 48, and the sealing layer 128 disposed over the scintillator layer 301 opposite the barrier layer 126, optionally in conjunction with the thickened area of the second dielectric layer 124 disposed above the data transfer lines 48, the x-ray imaging detector 101 overcomes the image quality issue present in prior art detector arrays 1000. In particular, the use of the sealing layer 128 over the scintillator layer 301 maintains the moisture sealing or barrier properties to enable stable performance of the spatial resolution provided by the scintillator 301 as measured by the modulation transfer function (MTF), similar to the performance of prior art detectors 1001 as shown in the graph of FIG. 12. Further, due to the presence of the shield layer 126 there is also observed a consistent level of electronic noise in the scan/image data due to the significant reduction and/or elimination of dynamic charge coupling between the scintillator layer 301 and the conductive data transfer lines 48, as shown by the data represented in the graph of FIG. 13, thereby negating the degradation of the Signal-to-Noise Ratio (SNR) as in prior art detectors 1001.

Figure 13:
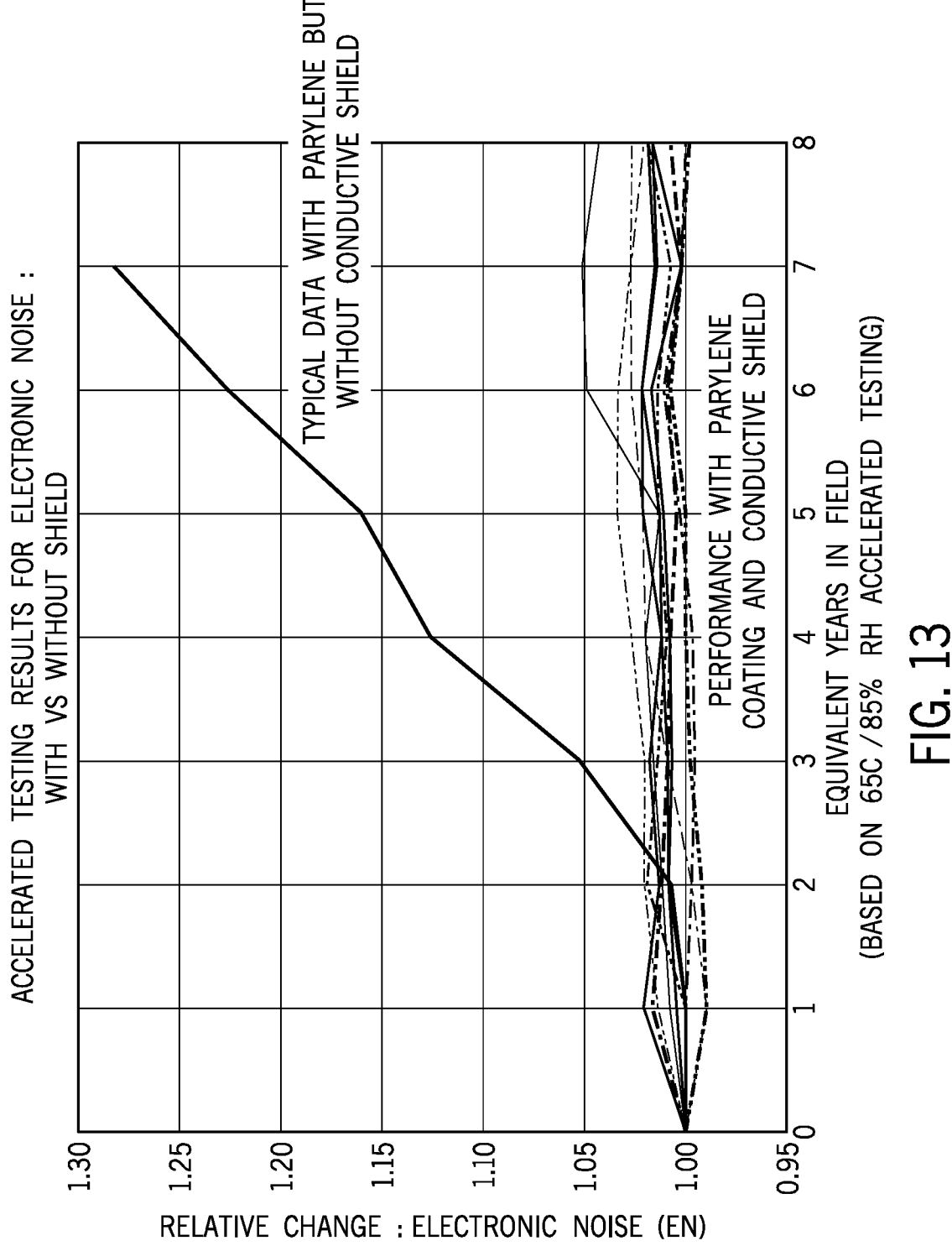
FIG. 13 is a graph of electronic noise versus time for a detector constructed with the shield layer according to the present disclosure.
Figure 14:
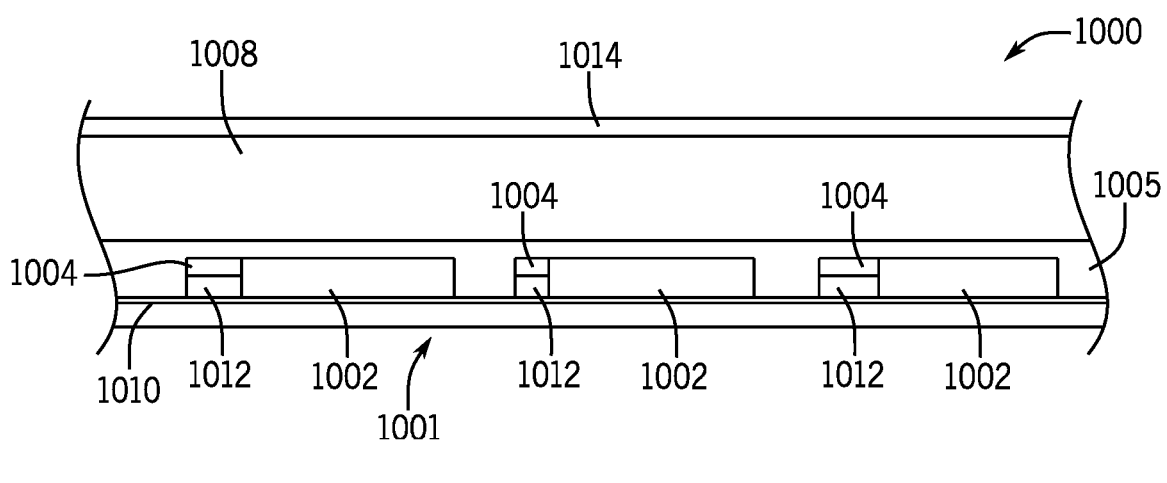
FIG. 14 is a schematic view of a detector array constructed according to the current state of the relevant technology including a scintillator and a moisture barrier layer.

The tests performed to provide the data in each of FIGS. 12 and 13 were each performed with an accelerated testing procedure of operating the various detectors (e.g., FIG. 12, evaluating MTF for detectors 101, with shield layer 126 and with and without moisture barrier/parylene layer 128; FIG. 13 evaluating electronic noise (EN) for detectors 101, with the moisture barrier/parylene layer 128 and with and without shield layer 126) at a temperature of 65° C. and a relative humidity=85%. The detectors utilized in the testing were 100 μm pitch array detectors.

FIG. 12 shows stable spatial resolution (fMTF50—the spatial frequency at which the MTF has a value of 50%) of both the x-ray imaging detector 101 of the present disclosure and detectors with a parylene layer but omitting the shield layer 126 over the equivalent time of eight (8) years in the field. Further, FIG. 13 illustrates stable electronic noise (EN) for the x-ray imaging detector 101 of the present disclosure over the equivalent time of eight (8) years in the field, while significant increases in EN are observed in detectors omitting the shield layer 126 after a period of only two (2) years, with the observed noise increasing significantly in each successive year of testing. For each of FIGS. 12 and 13, the thin data lines each corresponds to a configuration for the x-ray imaging detector 101 consistent with this disclosure, i.e., an approximately 1.8 μm thick parylene coating/sealing layer 128 over the CsI scintillator layer 301, and a thin (about 0.07 μm thick) conductive transparent shield layer 126 of indium-tin-oxide disposed over the data transfer lines 48, including an about 4.0 μm thick second dielectric layer 124 between the data transfer line 48 and the shield layer 126. As such, the presence of the shield layer 126 greatly enhances the useful life of an x-ray imaging detector 101 by preventing degradation of the image quality parameters (e.g., MTF and SNR) of the x-ray imaging detector 101, thereby maintaining the image quality of the x-ray imaging detector 101 across the resulting enhanced or extended useful life.

In an alternative exemplary embodiment, the photosensor 103 can function directly as the x-ray imaging detector 101, without the need for the adhesive 107 and the backing substrate 109. Read out electronics 105 can be incorporated directly into the photosensor 103 to enable electric signals to be sent between the photosensor 103 and the imaging system 10.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An x-ray imaging detector comprising:
   a) a photosensor including at least one photosensitive element positioned over a substrate;
   b) a data transfer line positioned over the substrate and operably connected to the at least one photosensitive element;
   c) a dielectric layer disposed over the data transfer line and the at least one photosensitive element;
   d) a shield layer disposed on the dielectric layer over the data transfer line and the at least one photosensitive element; and
   e) a scintillator layer disposed on the shield layer opposite the dielectric layer.

2. An x-ray imaging detector comprising:
   a) a photosensor including at least one photosensitive element disposed over a substrate;
   b) a data transfer line disposed over the substrate and operably connected to the at least one photosensitive element;
   c) a first dielectric layer disposed between the substrate and the data transfer line
   d) a second dielectric layer disposed over the data transfer line;
   e) a shield layer disposed on the second dielectric layer opposite the data transfer line; and
   f) a scintillator layer disposed on the shield layer opposite the second dielectric layer.

3. The x-ray imaging detector of claim 2, further comprising a sealing layer disposed over the scintillator layer opposite the shield layer.

4. The x-ray imaging detector of claim 3, wherein the sealing layer is formed of parylene.

5. The x-ray imaging detector of claim 2, wherein the shield layer is an indium-tin-oxide layer.

6. The x-ray imaging detector of claim 2, wherein the shield layer has a thickness of between about 0.05 μm and about 1.0 μm.

7. The x-ray imaging detector of claim 2, wherein the dielectric layer has a thickness of between about 2.0 μm and about 6.0 μm between the data transfer line and the shield layer.

8. The x-ray imaging detector of claim 2, further comprising an insulating layer disposed between the shield layer and the scintillator layer.

9. The x-ray imaging detector of claim 2, wherein the scintillator layer is a cesium iodide scintillator layer.

10. The x-ray imaging detector of claim 2, further comprising read out electronics disposed on the substrate and operably connected to the data transfer line, the read out electronics adapted to be operably connected to an imaging system to transmit electrical signals between the photosensor and the imaging system.

11. An x-ray imaging system comprising:
    a) an x-ray source;

b) an x-ray imaging detector positioned to receive radiation emitted from the x-ray source through an object positioned between the x-ray source and the x-ray imaging detector; and c) a system controller operably connected to the x-ray source and the x-ray detector to control the operation of the x-ray source and the x-ray imaging detector;

the x-ray imaging detector comprising:

i) a substrate;

ii) read out electronics disposed on the substrate and operably connected to the system controller;

iii) a photosensor disposed on the substrate and operably connected to the read out electronics, the photosensor comprising at least one photosensitive element and a data transfer line operably connected between the at least one photosensitive element and the read out electronics;

iv) a dielectric layer disposed on the substrate over the data transfer line and the at least one photosensitive element;

v) a shield layer disposed on the dielectric layer opposite the substrate over the data transfer line and the at least one photosensitive element; and vi) a scintillator layer disposed on the shield layer opposite the dielectric layer.

12. The x-ray imaging system of claim 11, further comprising a sealing layer disposed on the scintillator layer opposite the shield layer.

13. The x-ray imaging system of claim 12, wherein the sealing layer is formed of parylene.

14. The x-ray imaging system of claim 11, wherein the shield layer is an indium-tin-oxide layer.

15. The x-ray imaging system of claim 11, wherein the shield layer has a thickness of between about 0.05 μm and about 1.0 μm.

16. The x-ray imaging system of claim 11, wherein the dielectric layer has a thickness of between about 2.0 μm and about 6.0 μm between the data transfer line and the shield layer.

17. A method of forming an x-ray imaging detector comprising the steps of:

a) forming an array of photosensitive elements on a substrate layer, each photosensitive element including a photodiode and a thin film transistor;

b) forming data transfer lines on the substrate layer, the data transfer lines operably connected to each of the photosensitive elements;

c) forming a dielectric layer over the array of photosensitive elements and the data transfer lines;

d) forming a shield layer over and coextensive with the dielectric layer;

e) forming a scintillator layer over the shield layer; and f) forming a sealing layer over the scintillator layer.

18. The method of claim 17, wherein the dielectric layer has a thickness of between about 2.0 μm and about 6.0 μm between the data transfer lines and the shield layer.

19. The method of claim 17, wherein the shield layer is an indium-tin-oxide layer.

20. The method of claim 17, wherein the sealing layer is a parylene layer.

\* \* \* \* \*